United States Patent [19]
Darby et al.

[11] Patent Number: 5,835,873
[45] Date of Patent: Nov. 10, 1998

[54] VEHICLE SAFETY SYSTEM WITH SAFETY DEVICE CONTROLLERS

[75] Inventors: Christopher Paul Darby, Coventry, England; Harald Snorre Husby, Lakeland, Fla.

[73] Assignee: Breed Automotive Technology, Inc., Lakeland, Fla.

[21] Appl. No.: 804,443

[22] Filed: Feb. 21, 1997

[51] Int. Cl.$^6$ .................................. B60R 21/16
[52] U.S. Cl. .............................. 701/45; 701/29; 701/48; 180/268
[58] Field of Search .................................. 701/45, 46, 48, 701/49, 29, 30, 31, 33, 34, 35, 37, 38, 39, 41, 43; 280/728.1, 730.1, 734, 735, 801.1; 180/268, 274, 282; 340/438

[56] References Cited

U.S. PATENT DOCUMENTS

| | | | |
|---|---|---|---|
| 4,381,829 | 5/1983 | Montaron | 180/274 |
| 5,101,192 | 3/1992 | Ishizuka | 340/436 |
| 5,283,472 | 2/1994 | Takeuchi et al. | 307/10.1 |
| 5,327,990 | 7/1994 | Busquets | 180/271 |
| 5,359,515 | 10/1994 | Weller et al. | 701/45 |
| 5,398,185 | 3/1995 | Omura | 701/45 |
| 5,407,228 | 4/1995 | Shibata et al. | 280/735 |
| 5,411,289 | 5/1995 | Smith | 280/735 |
| 5,416,360 | 5/1995 | Huber et al. | 307/10.1 |
| 5,461,567 | 10/1995 | Kelley et al. | 701/45 |
| 5,475,269 | 12/1995 | Takeuchi | 307/10.1 |
| 5,521,588 | 5/1996 | Kiihner et al. | 340/825.22 |
| 5,540,461 | 7/1996 | Nitschke et al. | 280/735 |
| 5,546,307 | 8/1996 | Mazure et al. | 364/424.05 |
| 5,554,890 | 9/1996 | Kinoshita | 307/10.1 |
| 5,583,383 | 12/1996 | Denz et al. | 307/10.2 |
| 5,605,202 | 2/1997 | Dixon | 180/268 |
| 5,610,575 | 3/1997 | Gioutsos | 340/429 |
| 5,712,784 | 1/1998 | Fendt et al. | 701/45 |
| 5,732,375 | 3/1998 | Ohm | 701/45 |

*Primary Examiner*—Tan Q. Nguyen
*Attorney, Agent, or Firm*—L. R. Drayer; D. Russell

[57] ABSTRACT

A vehicle safety system having a plurality of safety device controllers and a method of controlling same are disclosed. The vehicle safety system provides for the protection of vehicle occupants in the event of a vehicle crash. The system is capable of controlling safety devices such as airbag assemblies, seat belt tensioner assemblies, fuel cutoff switch assemblies, battery disconnect switch assemblies, assemblies for sending notification to emergency services, and assemblies for sending vehicle location data. The system accepts data from other vehicle systems such as speed data from the antilock brake system to distinguish between a low speed and a high speed crash, seat occupancy data to selectively activate airbags, and steering system and acceleration data to detect vehicle rollover conditions. The system provides for fault detection and notification to the vehicle operator, as well as immunity from electromagnetic interference through the use of distributed controllers that communicate with a central electronic control unit over digital communication bus using coded commands and data. Each controller has the capability of performing self-tests and communicating the results to the central electronic control unit.

41 Claims, 6 Drawing Sheets

VEHICLE SAFETY SYSTEM WITH SAFETY DEVICE CONTROLLERS

BACKGROUND

This invention relates to vehicle safety systems that provide protection for vehicle occupants in the event of a vehicle crash, and more particularly, a vehicle safety system that employs fault detection and selective safety device activation, utilizing distributed safety device controllers that communicate with a central electronic control unit.

Vehicle collision/control systems that detect a collision event and activate safety devices such as airbags by igniting bridgewire or semiconductor squibs are known in the art. These systems are required to operate reliably in the event of a major vehicle impact, but must also be relied upon to not operate in the event of a minor vehicle impact or no vehicle impact. One type of collision/control system is located adjacent to the safety device and acts independently of other such systems. The criteria for activating the safety device by these systems is based on the level of acceleration detected by an associated acceleration sensor. These independent systems do not take into consideration such factors as vehicle speed, acceleration direction, seat position occupancy, etc., and have no means of detecting component failures or communicating these failures to the vehicle operator. They may or may not employ a microprocessor to control the activation of the associated safety device by firing the associated squib or actuating an electromechanical device. Another type of collision/control system uses a central control unit, usually having an embedded microprocessor, that reads acceleration sensor data and decides whether or not to activate all of the vehicle safety devices, such as airbags and seatbelt tensioners, by igniting the associated squibs or electromechanical devices. These vehicle safety devices are controlled directly from the central control unit. These systems usually have limited means of component failure detection, and do not use data from other vehicle systems such as vehicle speed, acceleration direction, seat position occupancy, etc., in order to decide which safety devices to selectively activate. Yet another problem of activating the vehicle safety devices directly from the central control unit in this configuration is that the safety device activation signals are hardwired directly to the central control unit. In this configuration, cable short circuits of the activation signal to battery voltage or ground could accidentally actuate the safety device. Induced transients and other electromagnetic interference could also have detrimental effects on safety device operation in these configurations. Yet another disadvantage of these systems is that additional components must be added to the central control unit as additional safety devices are added to accommodate different vehicle configurations, such as the number of passenger seats. This adds to the space required for the central control unit in the vehicle to accommodate the maximum configuration of safety devices. Examples of collision/control systems are described in: U.S. Pat. No. 4,381,829; U.S. Pat. No. 5,101,192; U.S. Pat. No. 5,283,472; U.S. Pat. No. 5,327,990; U.S. Pat. No. 5,359,515; U.S. Pat. No. 5,407,228; U.S. Pat. No. 5,416,360; U.S. Pat. No. 5,475,269; U.S. Pat. No. 5,546,307; and U.S. Pat. No. 5,554,890.

It is desirable to have a vehicle safety system that provides a high degree of reliability, and has the capability of extensive failure detection and notification to the vehicle operator of any failures. It is also desirable to only actuate the safety devices upon a major vehicle impact by making use of vehicle velocity data, typically available from the vehicle antilock brake system. Another desirable feature is the capability of selectively actuating vehicle safety devices based upon seat occupancy data from a vehicle passenger occupancy system. Yet another desirable feature is to selectively actuate the vehicle safety devices based upon vehicle roll-over data derived from the vehicle active suspension system, steering system, or other devices. By providing the capability of storing device activation energy locally to the safety device, and by requiring a coded message from the central control unit to activate the safety device, deleterious effects due to cable shorts to battery power or ground of the energy activation connections to a safety device or due to electromagnetic interference may be greatly reduced or eliminated. In addition to these requirements, the vehicle collision/control system must be easily and inexpensively fabricated, assembled, installed in a vehicle, and tested. A vehicle safety system that does not require variations in the central control unit for different vehicle configurations, and has extensive fault diagnostic capability meets these requirements.

SUMMARY

The present invention is directed to a vehicle safety system with safety device controllers, to a method of controlling a vehicle safety system with safety device controllers, to a safety device controller, and to a method for controlling the activation of a vehicle safety device in a vehicle safety system. The system provides protection and prevents injury to vehicle occupants in the event of a vehicle crash, collision, or impact. The vehicle safety system is comprised of a central electronic control unit that communicates with safety device controllers over a bi-directional communication bus. The safety device controllers are associated with and may be located in close proximity to vehicle safety devices such as airbags, seatbelt tensioners, fuel cutoff switches, etc. Thus, the safety device controllers are distributed throughout the vehicle and are enabled by a coded command from the central electronic control unit. Each safety device controller is capable of testing itself by exercising diagnostic tests that generate integrity data which is sent to the electronic control unit on command. This provides for early detection and correction of component failures. The vehicle safety system makes use of data from other vehicle systems such as an antilock brake system, active suspension system and steering system. The system also uses dynamic data from an accelerometer sensor and static data based upon vehicle crash parameters and passenger configuration parameters in order to activate selected safety devices, based on factors such as vehicle velocity, seat occupancy data, severity and location of crash, etc. Since the electronic control unit and the safety device controllers utilize microprocessor technology, the system software may be readily programmed to accommodate various vehicle configurations and safety device characteristics. The present invention provides for a high degree of reliability because of its distributed nature, and extensive fault detection and notification capability. It makes use of vehicle velocity data to discriminate between major and minor vehicle impacts, and is capable of selective activation of safety devices based upon data, such as passenger seat occupancy and vehicle roll-over conditions, from other vehicle systems. The present invention makes use of a coded message from the central control unit to the safety device controllers located at the safety device for safety device activation, and provides for safety device activation energy located at the safety device, eliminating the need to transmit high current pulses over extended lengths of wire thereby reducing electromagnetic interference that may have a deleterious effect on vehicle systems operation. This also results in a great reduction if not a complete elimination of deleterious effects of accidental activation of a safety device due to cable short circuits of the safety device activation signal to battery power or ground of the energy activation connections to a safety device, or due to electromagnetic interference. This invention also is easily and inexpensively fabricated, assembled, installed in a vehicle and tested. The vehicle safety system allows for expansion by adding additional safety devices and associated safety device controllers without requiring additional central electronic control unit hardware. The present embodiment of the invention is capable of controlling a wide variety of vehicle safety devices, including airbags, seatbelt tensioners, fuel cutoff switches, battery disconnect switches, emergency notification devices, and devices for identifying the location of the vehicle.

A system having features of the present invention is a vehicle safety system with safety device controllers comprising a plurality of safety device controllers, each safety device controller controlling activation of a vehicle safety device. Each safety device controller communicates with an electronic control unit over a communication bus. The electronic control unit includes a control means for interchanging data with a communication means, with an external data interface means, with a diagnostic port interface means, with an acceleration sensor device, and with a memory means, and for performing control algorithms. The communication means of the electronic control unit includes a means for sending safety device activation commands to the safety device controllers over the communication bus and for communication protocol management. The external data interface means of the electronic control unit includes a means for sending and receiving data to and from other vehicle systems. The diagnostic port interface means of the electronic control unit is a means for performing service diagnostic tests on the vehicle safety system. The acceleration sensor device of the electronic control unit is a means for measuring vehicle acceleration direction and magnitude. The memory means of the electronic control unit includes a means for storing vehicle crash parameters, passenger configuration parameters, data from the acceleration sensor device, system integrity data, and system fault warning messages.

In an alternate embodiment of the invention, the communication means of the electronic control unit has the means for sending integrity data commands to safety device controllers over the communication bus, a means for receiving integrity data from the safety device controllers over the communication bus, and a means for receiving fault warning messages from the safety device controllers over the communication bus. In another embodiment of the invention, the safety device activation commands and the integrity data commands of the communication means of the electronic control unit are comprised of a binary coded address part and a binary coded command part. Alternative embodiments of the communication bus include a digital electronic bi-directional serial communication bus, a digital electronic bi-directional parallel communication bus, and a digital fiber-optic bi-directional serial communication bus. In another embodiment of the invention, the control means is a microprocessor for controlling the communication means, for controlling the data interface means, for controlling the diagnostic port means, for controlling the acceleration sensor device, and for controlling the memory means. Other embodiments of the invention include at least one of the safety device controllers installed in and activating one of the following safety devices: a driver airbag assembly; a passenger airbag assembly; a seatbelt tensioner assembly; a fuel cutoff switch assembly; a battery disconnect switch assembly; an emergency notification means for notifying emergency services; and a location notification means for identifying the location of the vehicle.

In another embodiment of the invention, the control means further comprises a means for performing vehicle crash algorithms in response to vehicle crash parameters and data from the acceleration sensing device, for performing safety device activation logic in response to passenger configuration parameters and the vehicle crash algorithms, and for performing system diagnostic tests and fault notification in response to system integrity data and system fault warnings. In another embodiment of the vehicle safety system, the external data interface means comprises a means for receiving, alternately or in combination, vehicle velocity data, vehicle suspension system data, vehicle steering system data, and vehicle harness type data, which is sent to the control means, and the control means further comprises a means for performing the vehicle crash algorithms in response to the vehicle velocity data, vehicle suspension system data, vehicle steering system data and vehicle harness type data. In an alternate embodiment, the external data interface means receives the vehicle velocity data from an antilock brake system. In another alternate embodiment, the external data interface means further comprises a means for receiving vehicle passenger seat occupancy data, which is sent to the control means, and the control means further comprises a means for performing the safety device activation logic in response to the passenger seat occupancy data.

The preferred embodiment of the present invention is a vehicle safety system with safety device controllers comprising a plurality of safety device controllers, each of the safety device controllers controlling a safety device activation. Each of the safety device controllers communicates with an electronic control unit over a high speed, digital electronic bi-directional serial communication bus. The electronic control unit comprises a communication means, an external data interface means, an acceleration sensor device, a nonvolatile memory means, a diagnostic port means, and a control means. The communication means sends safety device activation and integrity data commands to the safety device controllers over the high speed, digital electronic bi-directional serial communication bus; and receives safety device integrity data and fault warning messages over the high speed, digital electronic bi-directional serial communication bus from the safety device controllers. The external data interface means receives velocity data from a vehicle antilock brake system, suspension system data from a vehicle active suspension system, steering system data from a vehicle steering system, seat capacity data from a passenger seat occupant sensing system, and harness type data from the vehicle wiring harness. The acceleration sensor device is secured firmly to the vehicle and measures vehicle acceleration direction and magnitude along three orthogonal axes of motion. The nonvolatile memory means stores vehicle crash parameters, passenger configuration parameters, data from the acceleration sensor device, system integrity data, fault warning messages, vehicle crash algorithms, and safety device activation logic. The diagnostic port means is for performing service diagnostic tests on the vehicle safety system, for reading data and fault warning messages from the nonvolatile memory, and for reading safety device controller integrity data from the safety device controller, usually in a repair facility. The control means is a microprocessor that receives safety device controller integrity data and fault warning messages from the communication means; receives passenger seat occupancy data, vehicle harness data, vehicle velocity data, and vehicle suspension system data from the external data interface means; receives vehicle acceleration direction and magnitude from the acceleration sensing device; sends data to the diagnostic port means; and reads and writes vehicle crash parameters, passenger configuration parameters, data from the acceleration sensing device, system integrity data, system fault warning messages, vehicle crash algorithms, and safety device activation logic to the nonvolatile memory means. The control means also performs vehicle crash algorithms and safety device activation logic in response to system integrity data, passenger seat occupancy data, vehicle harness type, vehicle velocity data, vehicle suspension system data, vehicle acceleration data, vehicle crash parameters, and passenger configuration parameters; and sends safety device activation commands to the communication means. In an alternate of the preferred embodiment, the diagnostic port means complies with International Standards Organization standard 9141 for performing diagnostic tests. Other alternates to the preferred embodiment include a high speed, digital electronic bi-directional parallel communication bus rather than a serial bus; a high speed, digital fiber-optic bi-directional serial communication bus rather than a digital electronic bus; a high speed, digital electronic bi-directional serial communication bus comprised of two electrical conductor cable; and a high speed, digital electronic bi-directional serial communication bus comprised of two electrical conductor cable that carries coded commands to the safety device controllers, data and fault warning messages to the electronic control unit, and also supplies power to the safety device controllers. In another alternate to the preferred embodiment, the communication means safety device activation commands and integrity data commands are comprised of a binary coded address part and a binary coded command part. In other embodiments of the preferred embodiment of the invention described, at least one of the safety device controllers is installed in and activates one of the following safety devices: a driver airbag assembly; a passenger airbag assembly; a seatbelt tensioner assembly; a fuel cutoff switch assembly; a battery disconnect switch assembly; an emergency notification means for notifying emergency services; and a location notification means for identifying the location of the vehicle.

A method for controlling a vehicle safety system with safety device controllers comprises the steps of: sending and receiving data from other vehicle systems; reading vehicle acceleration direction and magnitude data from an acceleration sensing device mounted firmly to the vehicle; reading integrity data and fault warning messages from safety device controllers; storing vehicle crash parameters, passenger configuration parameters, acceleration sensor data, system integrity data, and fault warning messages in a nonvolatile memory; performing vehicle crash algorithms and safety device activation logic in response to the other vehicle system data, the vehicle acceleration sensing device data, the system integrity data that includes safety device controller integrity data, the vehicle crash parameters, and the passenger configuration parameters; and sending safety device activation commands to selected safety device controllers in response to the vehicle crash algorithms and the safety device activation logic, which enables the selected safety device to activate. An alternate method for controlling a vehicle safety system is by including an additional step of communicating with a diagnostic port for performing service diagnostic test on the vehicle safety system. In a further alternate to the method for controlling a vehicle safety system, the step of reading data from other vehicle systems comprises reading vehicle passenger seat occupancy data, reading vehicle harness type, reading vehicle velocity data, reading vehicle suspension system data, and reading vehicle steering system data. In another alternate method, the step of reading vehicle acceleration data from an acceleration sensing device comprises the step of reading acceleration magnitude and direction along three orthogonal axes of direction. In an alternate embodiment of the method for controlling a vehicle safety system, the step of reading system integrity data comprises the steps of sending integrity data commands to the safety device controllers, reading integrity data from all safety device controllers, including reading integrity data of the safety device, of a safing means, of an energy storage capacitor, and of a safety device activation means, as well as reading functionality data of a power conversion means. In yet another embodiment, the step of sending safety device activation commands to selected safety device controllers comprises the steps of addressing each selected safety device controller and sending a coded command to each selected safety device controller on a high speed bi-directional communication bus, enabling the safety devices associated with the selected safety device controllers to activate. A further embodiment of a method of controlling a vehicle safety system is including the step of energizing a vehicle driver warning device upon the occurrence of a system fault warning message.

The safety device controllers are for controlling the activation of a safety device in a vehicle safety system and comprises a power means, a communication means, a diagnostic means, a control means, and a safety device activation means. The power means is for storing energy on an energy storage capacitor by charging the energy storage capacitor to a predetermined voltage. The communication means is for receiving a safety device activation command from a communication bus. The diagnostic means is for reading integrity data of the safety device controller. The control means is for generating a safety device activation signal in response to the safety device activation command and the integrity data. And the safety device activation means is for coupling the energy stored on the energy storage capacitor to a safety device in response to the safety device activation signal, whereby the energy storage capacitor discharges through the safety device causing the safety device to activate. An alternate embodiment of the safety device controller comprises the addition of a safing means interposed between the energy storage capacitor and the safety device activation means for preventing false activation of the safety device. The following include a number of alternate embodiments involving the power means of the safety device controller. One embodiment includes the addition of a power conversion means for providing a voltage level on the energy storage capacitor that is substantially above a voltage level of the power means available from a vehicle battery. Another embodiment of the power means includes the addition of a power conversion means for providing a voltage level on the energy storage capacitor and power supply voltages to the electronic circuits of the safety device controller in response to a vehicle battery power source. A further embodiment of the power means includes the addition of a power conversion means for providing a voltage level on the energy storage capacitor and power supply voltages to the electronic circuits of the safety device controller in response to a power source provided by the communication bus. There are several alternate embodiments involving the communication means. In one alternate embodiment of the communication means, the safety device activation command is comprised of a binary coded address part and a binary coded command part. In other alternate embodiments of the communication bus, the communication bus is a high speed, digital electronic bi-directional serial communication bus; the communication bus is a high speed, digital electronic parallel communication bus; and the communication bus is a high speed, digital fiber-optic bi-directional serial communication bus. In another embodiment of the safety device controller, the control means further comprises a means for reading the safety device controller integrity data from the diagnostic means, for comparing the safety device controller integrity data to predetermined limit values, and for generating fault warning messages if the predetermined limit values are exceeded; and the communication means further comprises a means for sending the safety device controller integrity data and the fault warning messages onto the communication bus in response to the control means. In another embodiment, the above means for reading and comparing integrity data, and the means for sending the integrity data onto the communication bus is in response to an integrity data command received by the communication means on the communication bus. In yet another embodiment of the safety device controller invention, the control means is a microprocessor for controlling the communication means, for controlling the diagnostic means, for controlling the safety device activation means, for monitoring power means availability, and for generating fault warning messages. In a further embodiment of the diagnostic means of the invention, the diagnostic means comprises a means for reading integrity data of the safety device controller comprising integrity data of the safety device, integrity data of the safing means, integrity data of the energy storage capacitor, integrity data of the safety device activation means, and functionality data of the power conversion means, and for providing the integrity data of the safety device controller to the control means. In a further embodiment of the communication means of the invention, the communication means further comprises a means for sending the safety device activation command to the control means from the communication bus, for sending the safety device controller integrity data onto the communication bus from the control means, and for managing communication bus protocol. Additional embodiments of the safety device controller include: locating the safety device controller in close proximity to the safety device to be activated; having the safety device controller activate a squib thereby causing a safety device to be activated; and having the safety device controller activate an electromechanical device thereby causing a safety device to be activated. In other embodiments of the invention described above, the safety device controller is installed in and activates one of the following safety devices: a driver airbag assembly; a passenger airbag assembly; a seatbelt tensioner assembly; a fuel cutoff switch assembly; a battery disconnect switch assembly; an emergency notification means for notifying emergency services; and a location notification means for identifying the location of the vehicle.

The preferred embodiment of the safety device controller for controlling activation of a safety device in a vehicle safety system comprises a communication means, a control means, a diagnostic means, a power conversion means, and a safety device activation means. The communication means is a means for receiving a device activation and an integrity data command from a high speed, digital electronic bi-directional serial communication bus, and for sending a safety device controller integrity data and fault warning messages onto the high speed, digital electronic bi-directional serial communication bus. The control means is a microprocessor for receiving the safety device activation and integrity data commands from the communication means, for receiving the safety device controller integrity data from the diagnostic means, for comparing the safety device controller integrity data to predetermined limits and generating fault warning messages, for sending the safety device controller integrity data and the fault warning messages to the communication means, and for generating and sending a device activation signal to a safety device activation means. The diagnostic means comprises a multiplexer and an analog-to-digital converter for reading the safety device controller integrity data and for sending the safety device controller integrity data to the control means. The power conversion means comprises a DC-to-DC converter for boosting the voltage level from a vehicle battery to a substantially greater voltage level than the voltage level of the vehicle battery, and for applying the substantially greater voltage level to an energy storage capacitor. The safety device activation means comprises semiconductor current switches for coupling energy stored on the energy storage capacitor to the safety device for activating the safety device upon receipt of a safety device activation signal from the control means. An alternate embodiment of the preferred embodiment includes a mechanical safing sensor interposed between the energy storage capacitor and the safety device activation means for preventing false activation of the safety device. Alternative embodiments to the high speed, digital electronic bi-directional serial communication bus include: a high speed, digital electronic bi-directional parallel communication bus; a high speed, digital electronic serial communication bus that is comprised of two electrical conductor cable; and a high speed, digital fiber-optic bi-directional serial communication bus. In a further embodiment of the safety device controller invention, the device activation command and the integrity data command are comprised of a binary coded address part and a binary coded command part. Alternative embodiments to the power conversion means are: the power conversion means comprises a DC-to-DC converter for boosting the voltage level from a vehicle battery to a substantially greater voltage level than the voltage level of the vehicle battery, for applying the substantially greater voltage level to an energy storage capacitor, and for providing power supply voltages to electronic circuits of the safety device controller; and the power conversion means comprises a DC-to-DC converter for boosting power provided by the high speed, digital electronic bi-directional serial communication bus, for applying the boosted power to an energy storage capacitor and for providing power supply voltages to electronic circuits of the safety device controller. In a further embodiment of the safety device controller, the diagnostic means comprises a means for reading integrity data of the safety device controller comprising integrity data of the safety device, integrity data of the safing means, integrity data of the energy storage capacitor, integrity data of the safety device activation means, functionality data of the power conversion means, and for sending the integrity data of the safety device controller to the control means. Additional embodiments of the safety device controller include: locating the safety device controller in close proximity to the safety device; having the safety device controller activate a squib thereby causing the safety device to activate; and having the safety device controller activate an electromechanical device thereby causing the safety device to activate. Other embodiments of the preferred embodiment of the safety device controller include the safety device controller installed in and activating one of the following safety devices: a driver airbag assembly; a passenger airbag assembly; a seatbelt tensioner assembly; a fuel cutoff switch assembly; a battery disconnect switch assembly; an emergency notification means for notifying emergency services; and a location notification means for identifying the location of the vehicle.

A method for controlling activation of a safety device in a vehicle safety system using a safety device controller comprises the steps of: storing energy on an energy storage capacitor from a power means by charging the energy storage capacitor; receiving a safety device activation command by a safety device controller from a communication bus; reading integrity data of the safety device controller; generating a safety device activation signal in response to the integrity data of the safety device controller and the safety device activation command received from the communication bus; and coupling the energy stored on the energy storage capacitor to the safety device in response to the safety device activation signal, causing the energy storage capacitor to discharge through the safety device thereby causing the safety device to activate. An alternate embodiment of the method for controlling activation of a safety device further comprises the step of preventing false activation of the safety device by interposing a safing means between the energy storage capacitor and the safety device whereby the discharge of the energy storage capacitor through the safety device is dependent upon the safing means. Several alternative embodiments to the step of storing energy storage capacitor further include: the step of providing a voltage level on the energy storage capacitor substantially above a voltage level of the power means available from a vehicle battery; the step of providing a voltage level on the energy storage capacitor and power supply voltages to electronic circuits of the safety device controller in response to a battery source; and the step of providing a voltage level on the energy storage capacitor and power supply voltages to electronic circuits of the safety device controller in response to a power source provided by the communication bus. In an alternate embodiment, the step of receiving a safety device activation command further comprises decoding a binary coded address part and a binary coded activation command part. A further embodiment of the method further comprises the steps of: collecting and comparing the safety device controller integrity data to predetermined limit values and generating fault warning messages if the predetermined limit values are exceeded; and sending the safety device controller integrity data and fault warning messages onto the communication bus. Two other alternate methods for controlling activation of a safety device include: coupling the energy stored on the energy storage capacitor to a squib in response to the safety device activation signal, causing the energy storage capacitor to discharge through the squib, and igniting the squib thereby causing the safety device to activate; and coupling the energy stored on the energy storage capacitor to an electromechanical device, such as a latching relay, in response to the safety device activation signal, causing the energy storage capacitor to discharge through the electromechanical device, actuating the electromechanical device thereby causing the safety device to activate.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
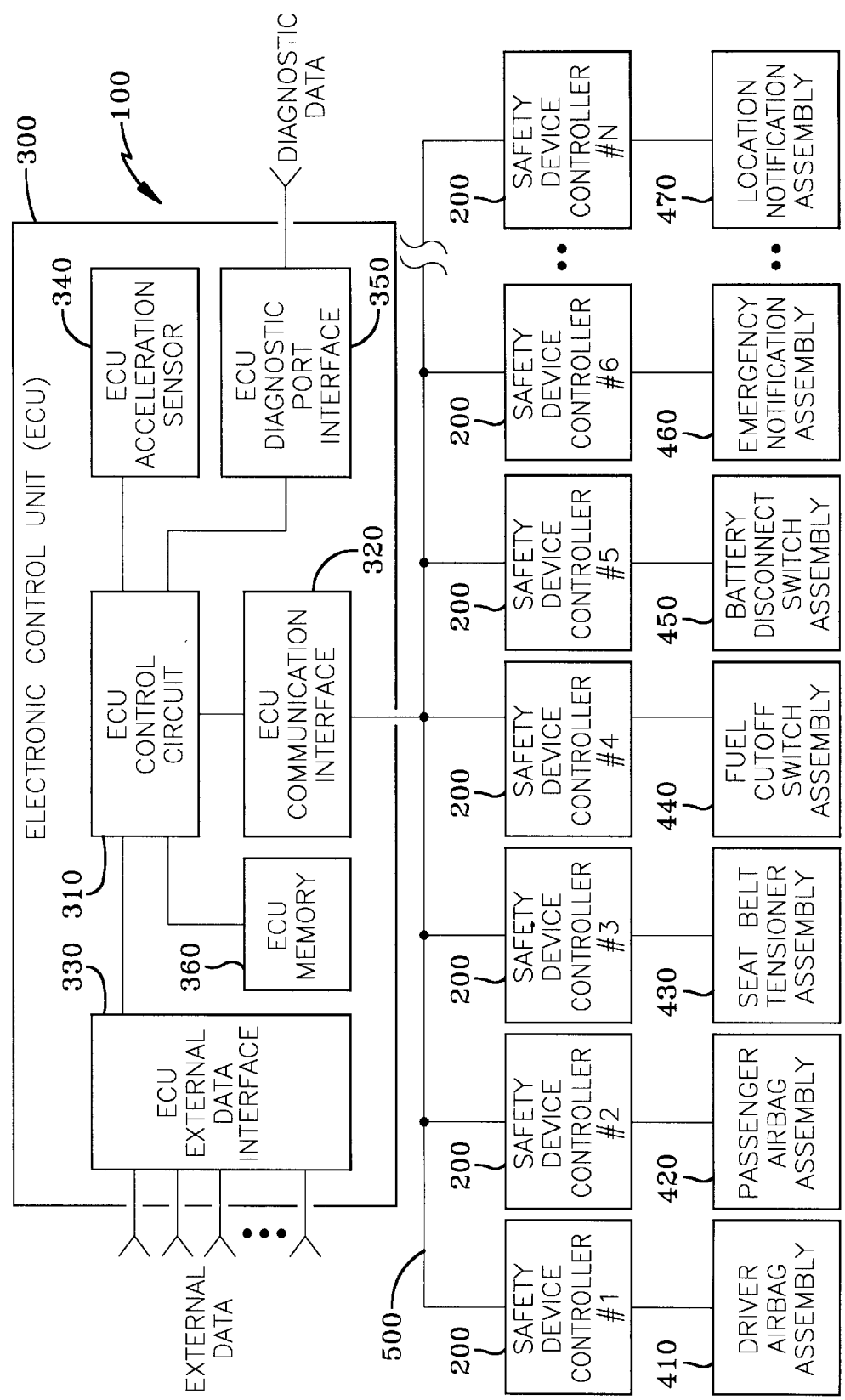
FIG. 1 shows a block diagram of a vehicle safety system with a plurality of safety device controllers for controlling safety devices, that communicate with an electronic control unit over a communication bus.

Turning now to FIG. 1, an embodiment of the vehicle safety system 100 is shown in accordance with the present inventive concepts. The vehicle safety system 100 comprises a plurality of safety device controllers 200, each of the safety device controllers controlling a safety device activation and is typically located in close proximity to the associated safety device. Typical safety devices depicted in FIG. 1 include, but are not limited to, a driver airbag assembly 410, a passenger airbag assembly 420, a seatbelt tensioner assembly 430, a fuel cutoff switch assembly 440, a battery disconnect switch assembly 450, an emergency notification assembly 460, and a location notification assembly 470. Each of the safety device controllers 200 communicates with an electronic control unit (ECU) 300 over a communication bus 500.

Referring to FIG. 1, the electronic control unit (ECU) 300 comprises an ECU communication interface 320, an ECU external data interface 330, an ECU diagnostic port interface 350, an ECU acceleration sensor 340, an ECU memory 360, and an ECU control circuit 310. The ECU communication interface 320 is connected to the ECU control circuit 310 for control and data interchange. The ECU communication interface 320 comprises a means for sending safety device activation commands and integrity data commands to the safety device controllers 200 over the communication bus 500. The ECU communication interface 320 also comprises a means for receiving integrity data and fault warning messages from the safety device controllers 200 over the communication bus 500, and manages the communication protocol used for sending and receiving data onto the communication bus 500. The safety device activation commands and the integrity data commands are comprised of a binary coded address part for selecting a particular safety device controller 200, and a binary coded command part that specifies the action to be performed by the selected safety device controller 200. The ECU external data interface 330 is connected to the ECU control circuit 310 for control and data interchange. The ECU external data interface 330 sends and receives data from other systems in the vehicle, including but not limited to velocity data from an antilock brake system, rollover data from an active suspension system, rollover data from a steering system, and passenger seat occupancy data from a passenger seat occupancy system. The ECU diagnostic port interface 350 is connected to the ECU control circuit 310 for control and data interchange. The ECU diagnostic port interface 350 comprises a means for an external device to perform service diagnostic tests on the vehicle safety system 100. This includes reading the contents of the ECU memory 360, performing diagnostic tests on the electronic control unit (ECU) 300, causing the safety device controllers 200 to perform diagnostic tests on themselves by collecting integrity data and generating fault warning messages, and accessing integrity data and fault warning messages from the safety device controllers 200. A version of the vehicle safety system 100 comprises an ECU diagnostic port interface 350 that complies with International Standards Organization standard 9141. The ECU acceleration sensor 340 is connected to the ECU control circuit 310 for control and data interchange. The ECU acceleration sensor 340 is firmly attached to the vehicle and measures acceleration magnitude and direction along one or more axes of vehicle motion and provides this data to the ECU control circuit 310. The data from the ECU acceleration sensor 340 provides data relating to the severity and direction of impact resulting from a vehicle crash. The ECU memory 360 is connected to the ECU control circuit 310 for control and data interchange. The ECU memory 360 comprises a means for storing vehicle crash parameters, passenger configuration parameters, data from the ECU acceleration sensor 340, system integrity data and fault warning messages from the electronic control unit (ECU) 300 and the safety device controllers 200, vehicle crash algorithms, and safety device activation logic. The ECU memory 360 is a nonvolatile memory in that the content is not lost when power is removed. The ECU control circuit 310 comprises a means for controlling and interchanging data with the ECU communication interface 320, with the ECU external data interface 330, with the ECU diagnostic port interface 350, with the ECU acceleration sensor 340, and with the ECU memory 360, and for performing control algorithms. Performing the control algorithms by the ECU control circuit 310 in order to decide whether to activate a safety device comprises performing vehicle crash algorithms in response to vehicle crash parameters and data from the ECU acceleration sensor 340, and performing safety device activation logic in response to passenger seat configuration parameters and the vehicle crash algorithms. The ECU control circuit 310 also performs system diagnostic tests and may provide fault notification to vehicle driver through the ECU external data interface 330. An example of a function performed by the crash algorithms is to determine if a vehicle crash is severe enough to warrant activation of safety devices based on vehicle velocity and acceleration. A further improvement would be to utilize roll-over data from a vehicle suspension system or a vehicle steering system as input to the crash algorithms to determine safety device activation. The ECU control circuit 310 can also utilize vehicle harness type data from the ECU external data interface 330 to determine vehicle type and configuration, and use this data as input data to the crash control algorithms and safety device activation logic. The vehicle velocity is typically derived from a vehicle antilock brake system. An example of a function performed by the safety device activation logic is to selectively enable activation of a safety device only where a passenger is located based on passenger seat occupancy data. The preferred embodiment of the ECU control circuit 310 comprises a microprocessor for performing the functions of the ECU control circuit 310 including controlling and interchanging data with the ECU communication interface 320, the ECU external data interface 330, controlling the ECU diagnostic port interface 350, controlling the ECU acceleration sensor 340, and controlling the ECU memory.

Figure 2:
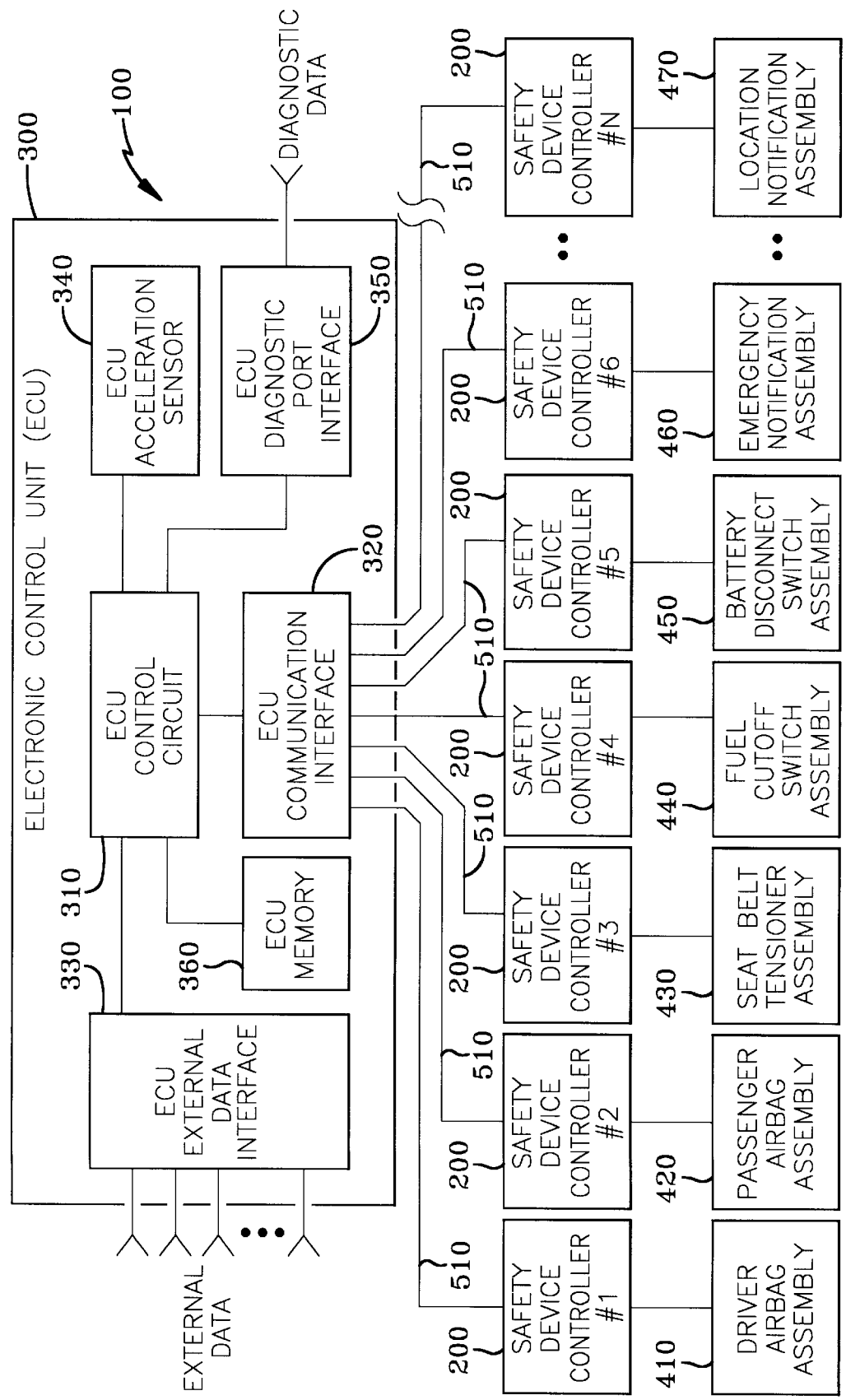
FIG. 2 shows a block diagram of a vehicle safety system with a plurality of safety device controllers for controlling safety devices, that communicate with an electronic control unit over a point-to-point communication bus.
Figure 3:
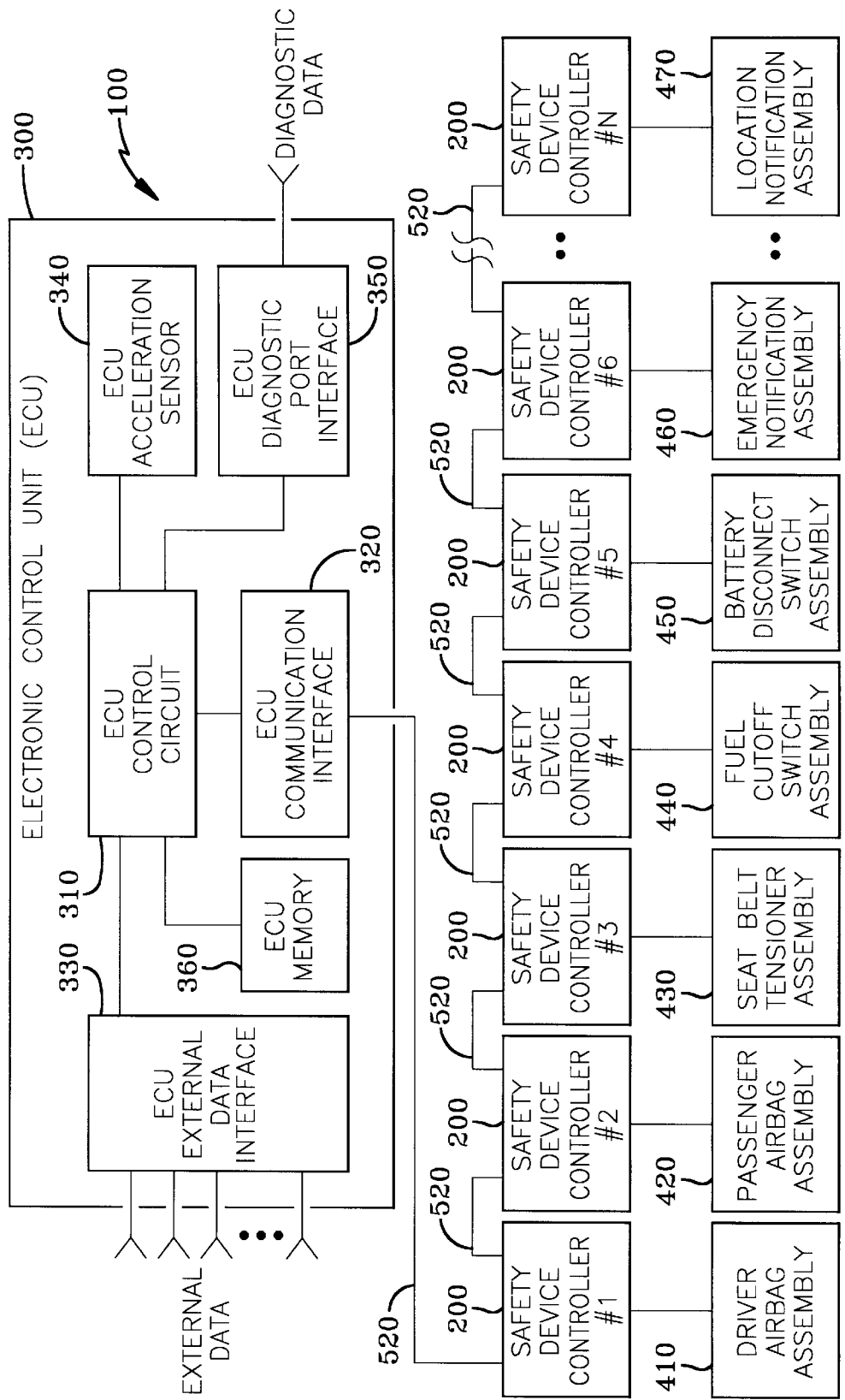
FIG. 3 shows a block diagram of a vehicle safety system with a plurality of safety device controllers for controlling safety devices, that communicate with an electronic control unit over a daisy-chained communication bus.

A generic communication bus 500 is depicted in FIG. 1. FIG. 2 depicts the same vehicle safety system 100 of FIG. 1, but with a point-to point communication bus 510 configuration. FIG. 3 depicts the same vehicle safety system 100 of FIG. 1, but with a daisy-chain communication bus 520 configuration. The point-to-point communication bus 510 configuration depicted in FIG. 2 is relatively complex and more expensive than the daisy-chain communication bus 520 configuration depicted in FIG. 3, since every safety device controller 200 shown in FIG. 2 requires a separate cable to be connected to the electronic control unit (ECU) 300. The daisy-chain communication bus 520 configuration depicted in FIG. 3 requires less cable and is easier to install than the point-to-point communication bus 510 configuration shown in FIG. 2. However, the communication bus configuration shown in FIG. 2 is more reliable the that shown in FIG. 3, since a broken cable in the FIG. 2 configuration will only disable one safety device controller, while a broken cable in the FIG. 3 configuration could, conceivably, disable all safety device controllers. In practice, a combination of both point-to-point and daisy-chain bus configurations would be utilized in a vehicle safety system. The preferred embodiment of the bus configurations shown in FIG. 1, FIG. 2, and FIG. 3 is a high speed, digital electronic bi-directional serial communication bus. Alternative embodiments include a high speed, digital electronic bi-directional parallel communication bus, and a high speed, digital fiber-optic bi-directional serial communication bus. A version of the high speed, digital electronic bi-directional serial communication bus is implemented using two electrical conductor cable. This two electrical conductor cable may be used to carry electrical energy to power the safety device controllers 200, as well as safety device activation commands, integrity data commands, safety device controller integrity data and fault warning messages.

The safety device controllers 200 are typically located in close proximity to the associated safety device, and usually activate a squib or an electromechanical device such as a latching relay, which then cause the safety device to be activated. The safety device controllers 200 are typically installed in and activate a wide variety of safety device assemblies including, but not limited to, driver airbag assemblies 410, passenger airbag assemblies 420, seatbelt tensioner assemblies 430, fuel cutoff switch assemblies 440, battery disconnect switch assemblies 450, emergency notification assemblies 460, and location notification assemblies 470.

Figure 4:
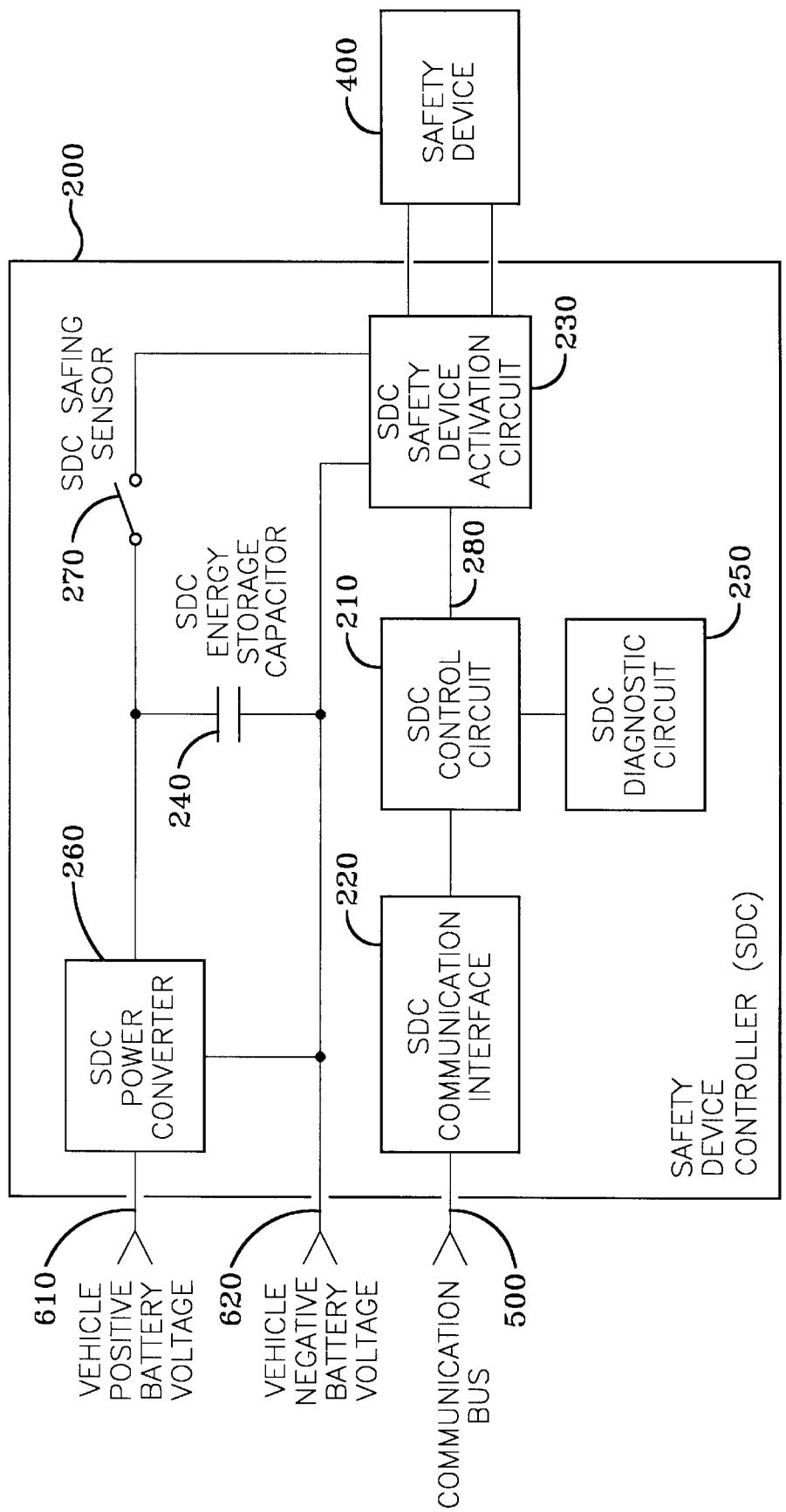
FIG. 4 shows a block diagram of a safety device controller where the vehicle battery provides power to charge the energy storage capacitor directly.

Turning now to FIG. 4, a block diagram of a safety device controller (SDC) 200 for controlling activation of a safety device 400 in a vehicle safety system, is depicted. The safety device controller (SDC) 200 is normally located in close proximity to an associated safety device 400, and is connected to a source of power, such as a vehicle positive battery voltage 610 and a vehicle negative battery voltage 620, and a communication bus 500. The safety device controllers 200 are typically installed in and activate a wide variety of safety device assemblies including, but not limited to driver airbag assemblies, passenger airbag assemblies, seatbelt tensioner assemblies, fuel cutoff switch assemblies, battery disconnect switch assemblies, emergency notification assemblies, and location notification assemblies. The safety device controller (SDC) 200 may activate the safety device 400 directly, may ignite a squib that causes the safety device 400 to activate, or may actuate an electromechanical device, such as a latching relay, that causes the safety device 400 to activate. The safety device controller (SDC) 200 comprises an SDC power converter 260 that receives its power from the vehicle positive battery voltage 610 and the vehicle negative battery voltage 620, and provides power to an SDC energy storage capacitor 240. The SDC energy storage capacitor 240 is connected to an SDC safing sensor 270, which is connected to an SDC safety device activation circuit 230. The safety device controller (SDC) 200 also comprises an SDC communication interface 220 which connects to the communication bus 500 and an SDC control circuit 210. The SDC control circuit 210 is also connected to an SDC diagnostic circuit 250 and the SDC safety device activation circuit 230. The SDC safety device activation circuit 230 is also connected to the safety device 400.

The SDC energy storage capacitor 240 shown in FIG. 4 stores safety device activation energy, and is charged to a voltage level supplied by the SDC power converter 260 which receives its power from the vehicle positive battery voltage 610 and the vehicle negative battery voltage 620. The voltage difference between the vehicle positive battery voltage 610 and the vehicle negative battery voltage 620 is typically twelve volts. The voltage supplied to the SDC energy storage capacitor 240 by the SDC power converter 260 is typically twenty five volts. The SDC power converter 260 is typically a DC-to-DC converter. In an alternate configuration of the safety device controller 200, the SDC power converter 260 also supplies regulated voltages to the electronic circuits that comprise the safety device controller. In another variation of the described embodiment of the safety device controller 200, the SDC power converter 260 derives power from a two electrical conductor cable used to implement a serial communication bus rather than from separate vehicle battery connections. The SDC energy storage capacitor 240 is also connected to the SDC safety device activation circuit 230 through the SDC safing sensor 270. The SDC safing sensor 270 is an electromechanical acceleration sensor that protects against inadvertent or false activation of the safety device 400. The safety device controller (SDC) 200 also comprises the SDC communication interface 220 for receiving safety device activation commands and integrity data commands from the communication bus 500, which are forwarded to the SDC control circuit. These commands typically comprise a binary coded address part that selects a particular safety device controller 200, and a binary coded command part that determines the action to be taken. The SDC communication interface 220 also manages communication bus protocol, and sends safety device controller integrity data and fault warning messages onto the communication bus 500 from the SDC control circuit 210 in response to an integrity data command. The communication bus 500 may comprise one of several variations: a high speed, digital electronic bi-directional serial communication bus in the preferred embodiment; a high speed, digital electronic bi-directional parallel communication in an alternate embodiment; or a high speed, digital fiber-optic bi-directional serial communication bus in another alternate embodiment. The SDC communication interface 220 is connected to the SDC control circuit 210 for control and data interchange.

The safety device controller (SDC) 200 of FIG. 4 also comprises the SDC control circuit 210 which is a microprocessor in the preferred embodiment, for controlling the SDC communication interface 220, the SDC diagnostic circuit 250 and the SDC safety device controller 230. The SDC control circuit 210 generates an SDC safety device activation signal 280 which is sent to the SDC safety device activation circuit 230 in response to a safety device activation command from the SDC communication interface 220 and safety device controller integrity data from an SDC diagnostic circuit 250 that does not indicate a malfunction. The SDC diagnostic circuit 250, which typically comprises a multiplexer and an analog-to-digital converter, comprises a means for reading the safety device controller integrity data, which includes integrity data for the SDC safing sensor 270, for the safety device 400, for the SDC energy storage capacitor 240, and for the SDC safety device activation circuit 230, and for reading functionality data of the SDC power converter 260. This data is provided to the SDC control circuit 210. Also, when the SDC control circuit 210 receives an integrity data command from the SDC communication interface, it reads the safety device controller integrity data from the SDC diagnostic circuit 250, compares the safety device integrity data with predetermined limit values, and generates fault warning messages if the predetermined limit values are exceeded. Then the safety device integrity data and any generated fault warning messages are sent to the communication bus 500 by the SDC communication interface 220. Upon receipt of the SDC safety device activation signal 280 from the SDC control circuit 210, the SDC safety device activation circuit 230 couples the energy stored on the SDC energy storage capacitor 240 to the safety device 400 in response to the safety device activation signal 280, if the SDC safing sensor 270 is activated. This results in discharging the SDC energy storage capacitor 240 through the safety device 400, causing the safety device 400 to activate. The SDC safety device activation circuit 230 is typically comprised of current switches.

Figure 5:
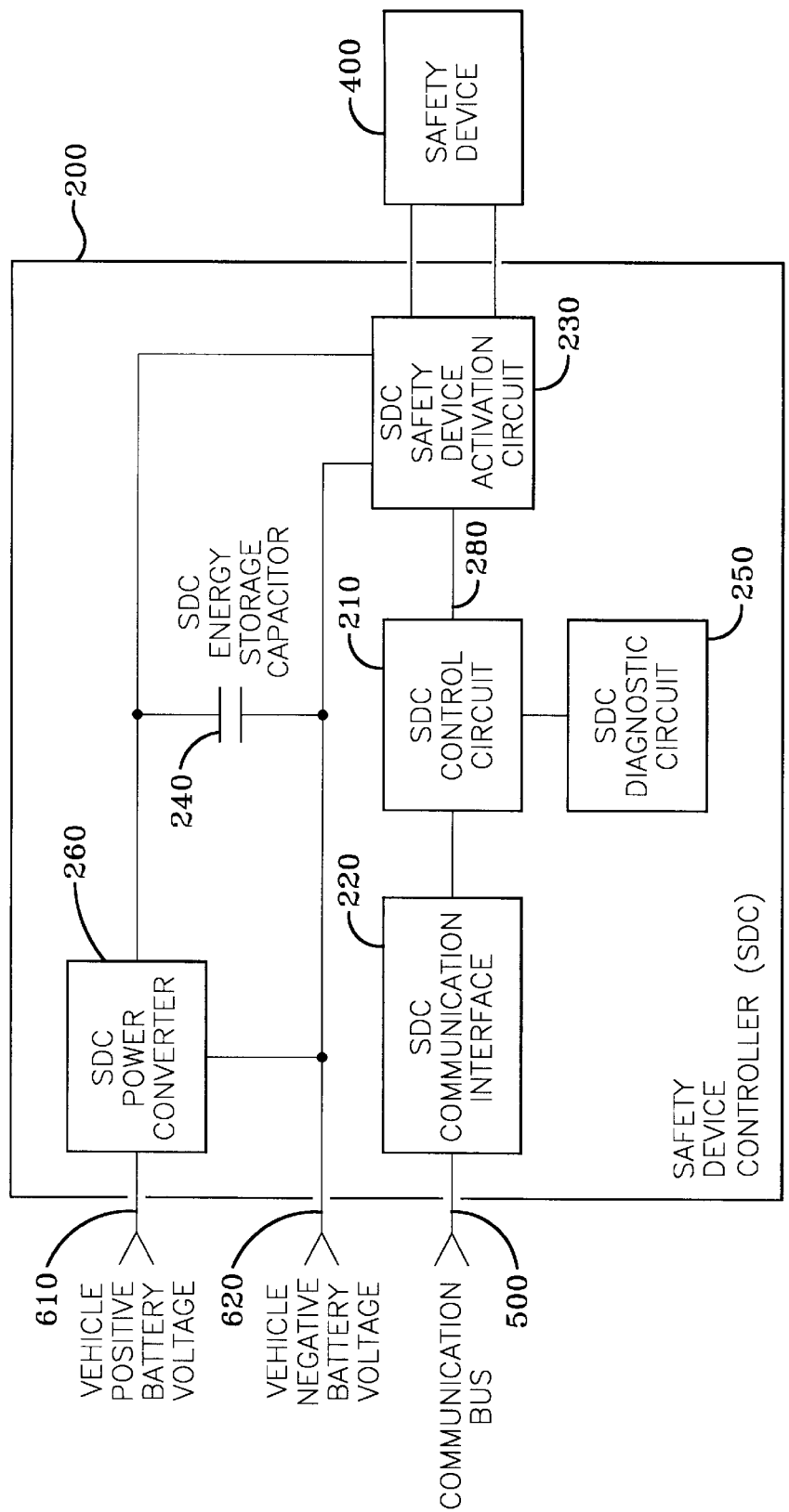
FIG. 5 shows a block diagram of a safety device controller where the vehicle battery provides power to a power converter that charges the energy storage capacitor.
Figure 6:
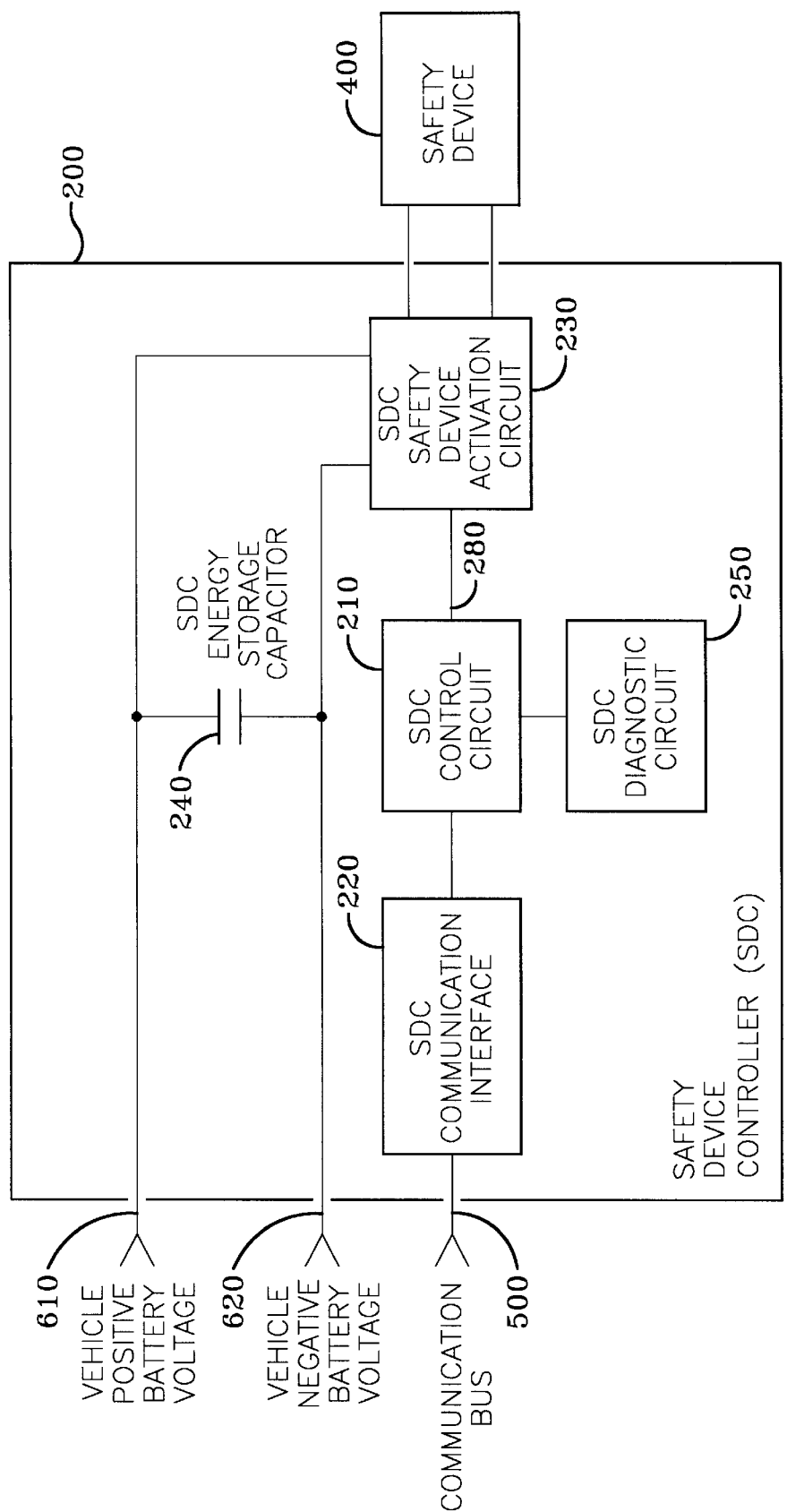
FIG. 6 shows a block diagram of a safety device controller where the vehicle battery provides power to a power converter that charges the energy storage capacitor, and a safing sensor is interposed between the energy storage capacitor and the safety device activation means.

FIG. 4 depicts a safety device controller 200 that has the features described above. However, there are a number of variations to the safety device controller 200 that can be made without exceeding the scope and spirit of the present embodiment description. In one example depicted in FIG. 5, the SDC safing sensor 270 has been eliminated from the depiction of FIG. 4. Another example depicted in FIG. 6, both the SDC safing sensor 270 and the SDC power converter have been eliminated from the depiction of FIG. 4.

Although the present invention has been described in considerable detail with reference to certain preferred versions thereof, other versions are possible. It should be understood that the embodiments described herein are merely exemplary and that many alternate embodiments and additional embodiments will become apparent to those skilled in the art. Accordingly such alternative embodiments are to be construed as being within the spirit of the present invention even though not explicitly set forth herein, the present invention being limited only by the content and scope of claims appended hereto.

We claim:

1. A vehicle safety system with safety device controllers comprising a plurality of safety device controllers, each of the safety device controllers controlling a safety device activation and communicating with an electronic control unit over a communication bus, the electronic control unit comprising:

(a) communication means for sending safety device activation commands comprising a coded address part and a coded command part to selected safety device controllers over the communication bus, for reading system integrity data and fault warning messages from the safety device controllers over the communication bus, and for communication protocol management;

(b) external data interface means for sending and receiving data from other vehicle systems;

(c) diagnostic port interface means for performing service diagnostic tests on the vehicle safety system;

(d) an acceleration sensor device mounted firmly to the vehicle for measuring vehicle acceleration direction and magnitude data;

(e) memory means for storing vehicle crash parameters, passenger configuration parameters, data from the acceleration sensor device, system integrity data, and system fault warning messages; and (f) control means for interchanging data with the communication means, with the external data interface means, with the diagnostic port means, with the acceleration sensor device, and with the memory means, and for performing control algorithms.

2. A vehicle safety system with safety device controllers according to claim 1, wherein the communication means further comprises a means for sending integrity data commands to safety device controllers over the communication bus, a means for receiving integrity data from the safety device controllers over the communication bus, and a means for receiving fault warning messages from the safety device controllers over the communication bus.

3. A vehicle safety system with safety device controllers according to claim 2, wherein the communication means safety device activation commands and integrity data commands are comprised of a binary coded address part and a binary coded command part.

4. A vehicle safety system with safety device controllers according to claim 2, wherein the control means further comprises a means for performing vehicle crash algorithms in response to vehicle crash parameters and data from the acceleration sensor device, for performing safety device activation logic in response to passenger configuration parameters and the vehicle crash algorithms, and for performing system diagnostic tests and fault notification to the vehicle driver.

5. A vehicle safety system with safety device controllers according to claim 4, wherein:

(a) the external data interface means further comprises a means for receiving vehicle velocity data, which is sent to the control means; and (b) the control means further comprises a means for performing the vehicle crash algorithms in response to the vehicle velocity data.

6. A vehicle safety system with safety device controllers according to claim 5, wherein the means for receiving vehicle velocity data is an antilock brake system.

7. A vehicle safety system with safety device controllers according to claim 4, wherein:

(a) the external data interface means further comprises a means for receiving vehicle passenger seat occupancy data, which is sent to the control means; and (b) the control means further comprises a means for performing the safety device activation logic in response to the passenger seat occupancy data.

8. A vehicle safety system with safety device controllers according to claim 4, wherein:

(a) the external data interface means further comprises a means for reading vehicle suspension system data, which is sent to the control means; and (b) the control means further comprises a means for performing the vehicle crash algorithms in response to the vehicle suspension system data.

9. A vehicle safety system with safety device controllers according to claim 4, wherein:

(a) the external data interface means further comprises a means for reading vehicle steering system data, which is sent to the control means; and (b) the control means further comprises a means for performing the vehicle crash algorithms in response to the vehicle steering system data.

10. A vehicle safety system with safety device controllers according to claim 4, wherein:

(a) the external data interface means further comprises a means for reading vehicle harness type data, which is sent to the control means; and (b) the control means further comprises a means for performing the vehicle crash algorithms in response to the vehicle harness type data.

11. A vehicle safety system with safety device controllers according to claim 2, wherein at least one of the safety device controllers is installed in and activates a driver airbag assembly.

12. A vehicle safety system with safety device controllers according to claim 2, wherein at least one of the safety device controllers is installed in and activates a passenger airbag assembly.

13. A vehicle safety system with safety device controllers according to claim 2, wherein at least one of the safety device controllers is installed in and activates a seatbelt tensioner assembly.

14. A vehicle safety system with safety device controllers according to claim 2, wherein at least one of the safety device controllers is installed in and activates a fuel cutoff switch assembly.

15. A vehicle safety system with safety device controllers according to claim 2, wherein at least one of the safety device controllers is installed in and activates a battery disconnect switch assembly.

16. A vehicle safety system with safety device controllers according to claim 2, wherein at least one of the safety device controllers is installed in and activates an emergency notification means for notifying emergency services.

17. A vehicle safety system with safety device controllers according to claim 2, wherein one of the safety device controllers is installed in and activates a location notification means for identifying the location of the vehicle.

18. A vehicle safety system with safety device controllers according to claim 1, wherein the communication bus is a digital electronic bi-directional serial communication bus.

19. A vehicle safety system with safety device controllers according to claim 1, wherein the communication bus is a digital electronic bi-directional parallel communication bus.

20. A vehicle safety system with safety device controllers according to claim 1, wherein the communication bus is a digital fiber-optic bi-directional serial communication bus.

21. A vehicle safety system with safety device controllers according to claim 1, wherein the control means further comprises a microprocessor for controlling the communication means, for controlling the external data interface means, for controlling the diagnostic port interface means, for controlling the acceleration sensor device, and for controlling the memory means.

22. A vehicle safety system with safety device controllers comprising a plurality of safety device controllers, each of the safety device controllers controlling a safety device activation and communicating with an electronic control unit over a high speed, digital electronic bi-directional serial communication bus, the electronic control unit comprising:

(a) communication means for sending safety device activation and integrity data commands to the safety device controllers over the high speed, digital electronic bi-directional serial communication bus and for receiving safety device controller integrity data and fault warning messages over the high speed, digital electronic bi-directional serial communication bus from the safety device controllers;

(b) external data interface means for receiving velocity data from a vehicle antilock brake system, for receiving suspension system data from a vehicle active suspension system, for receiving steering system data from a vehicle steering system, for receiving passenger seat occupancy data from a passenger seat occupant sensing systems, and for receiving harness type data from the vehicle wiring harness;

(c) an acceleration sensor device secured firmly to the vehicle frame for measuring vehicle acceleration direction and magnitude along three orthogonal axes of motion;

(d) nonvolatile memory means for storing vehicle crash parameters, passenger configuration parameters, data from the acceleration sensor device, system integrity data, system fault warning messages, vehicle crash algorithms, and safety device activation logic;

(e) diagnostic port means for performing service diagnostic tests on the vehicle safety system, for reading data and fault warning messages from the nonvolatile memory, and for reading safety device controller integrity data from the safety device controller;

(f) control means comprising a microprocessor for receiving safety device controller integrity data and fault warning messages from the communication means, for receiving passenger seat occupancy data, vehicle harness data, vehicle velocity data, and vehicle suspension data from the external data interface means, for receiving vehicle acceleration direction and magnitude from the acceleration sensing device, for sending data to the diagnostic port means and receiving data from the diagnostic port means, and for reading and writing vehicle crash parameters, passenger configuration parameters, data from the acceleration sensor device, system integrity data, system fault warning messages, vehicle crash algorithms, and safety device activation logic to the nonvolatile memory means; and (g) the control means comprising a means for performing vehicle crash algorithms and safety device activation logic in response to system integrity data, passenger seat occupancy data, vehicle harness data, vehicle velocity data, vehicle suspension system data, vehicle acceleration data, vehicle crash parameters, and passenger configuration parameters, and for sending safety device activation commands to the communication means.

23. A vehicle safety system with safety device controllers according to claim 22, wherein the diagnostic port means complies with International Standards Organization standard 9141 for performing service diagnostic tests.

24. A vehicle safety system with safety device controllers according to claim 22, wherein the high speed, digital electronic bi-directional serial communication bus is a high speed, digital electronic bi-directional parallel communication bus.

25. A vehicle safety system with safety device controllers according to claim 22, wherein the high speed, digital electronic bi-directional serial communication bus is a high speed, digital fiber-optic bi-directional serial communication bus.

26. A vehicle safety system with safety device controllers according to claim 22, wherein the high speed, digital electronic bi-directional serial communication bus is comprised of two electrical conductor cable.

27. A vehicle safety system with safety device controllers according to claim 26, wherein the two electrical conductor cable carries coded commands to the safety device controllers, data and fault warning messages to the electronic control unit, and power to the safety device controllers.

28. A vehicle safety system with safety device controllers according to claim 22, wherein the communication means safety device activation commands and integrity data commands are comprised of a binary coded address part and a binary coded command part.

29. A vehicle safety system with safety device controllers according to claim 22, wherein at least one of the safety device controllers is installed in and activates a driver airbag assembly.

30. A vehicle safety system with safety device controllers according to claim 22, wherein at least one of the safety device controllers is installed in and activates a passenger airbag assembly.

31. A vehicle safety system with safety device controllers according to claim 22, wherein at least one of the safety device controllers is installed in and activates a seatbelt tensioner assembly.

32. A vehicle safety system with safety device controllers according to claim 22, wherein one of the safety device controllers is installed in and activates a fuel cutoff switch assembly.

33. A vehicle safety system with safety device controllers according to claim 22, wherein one of the safety device controllers is installed in and activates a battery disconnect switch assembly.

34. A vehicle safety system with safety device controllers according to claim 22, wherein one of the safety device controllers is installed in and activates an emergency notification means for notifying emergency services.

35. A vehicle safety system with safety device controllers according to claim 22, wherein one of the safety device controllers is installed in and activates a location notification means for identifying the location of the vehicle.

36. A method for controlling a vehicle safety system with safety device controllers, comprising the steps of:

(a) sending safety device activation commands to selected safety device controllers over the communication bus by the communication means, reading system integrity data and fault warning messages from safety device controllers over the communication bus by the communication means, and managing communication protocol by the communication means;

(b) sending and receiving data from other vehicle systems by an external data interface means;

(c) performing service diagnostics on the vehicle safety system by a diagnostic port interface means;

(d) measuring vehicle acceleration direction and magnitude data by an acceleration sensing device mounted firmly to the vehicle;

(e) storing vehicle crash parameters, passenger configuration parameters, acceleration sensor device data, system integrity data, and system fault warning messages in a memory means; and (f) interchanging data by the control means with the communication means, with the external data interface means, with the diagnostic port means,
with the acceleration sensor device, and with the memory means, and performing control algorithms by the control means.

37. A method for controlling a vehicle safety system with safety device controllers according to claim 36, wherein the step of sending and receiving data from other vehicle systems comprises reading vehicle passenger seat occupancy data, reading vehicle harness type, reading vehicle velocity data, reading vehicle suspension system data, and reading vehicle steering system data.

38. A method for controlling a vehicle safety system with safety device controllers according to claim 36, wherein the step of measuring vehicle acceleration direction and magnitude data by an acceleration sensing device comprises reading acceleration magnitude and direction along two or more axes of direction.

39. A method for controlling a vehicle safety system with safety device controllers according to claim 36, wherein the step of reading system integrity data comprises sending integrity data commands to the safety device controllers, reading integrity data from all safety device controllers, including reading integrity data of the safety device, of a safing means, of an energy storage capacitor, of the safety device activation means, and reading functionality data of a power conversion means.

40. A method for controlling a vehicle safety system with safety device controllers according to claim 36, wherein the step of sending safety device activation commands to selected safety device controllers comprises addressing each selected safety device controller and sending a coded command to each selected safety device controller on a high speed, bi-directional communication bus, enabling the safety devices associated with the selected controller to activate.

41. A method for controlling a vehicle safety system with safety device controllers according to claim 36, further comprising the step of energizing a vehicle driver warning device upon a system fault warning message.

* * * * *